United States Patent
Sano

(10) Patent No.: US 7,346,191 B2
(45) Date of Patent: Mar. 18, 2008

(54) MOVING OBSTACLE DETECTING DEVICE

(75) Inventor: Yasuhito Sano, Yokohama (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 440 days.

(21) Appl. No.: 11/179,642

(22) Filed: Jul. 13, 2005

(65) Prior Publication Data

US 2006/0013480 A1    Jan. 19, 2006

(30) Foreign Application Priority Data

Jul. 13, 2004    (JP)    .......................... P2004-205989

(51) Int. Cl.
*G06K 9/00* (2006.01)

(52) U.S. Cl. ...................... 382/104; 382/103; 382/107; 382/168; 382/170; 348/208.14; 348/699

(58) Field of Classification Search ................ 382/103, 382/104, 107, 168, 170; 348/208.14, 699

See application file for complete search history.

(56) References Cited

U.S. PATENT DOCUMENTS

| | | | |
|---|---|---|---|
| 5,521,633 A * | 5/1996 | Nakajima et al. | 348/148 |
| 5,777,690 A * | 7/1998 | Takeda et al. | 382/103 |
| 6,445,809 B1 * | 9/2002 | Sasaki et al. | 382/104 |
| 6,704,621 B1 * | 3/2004 | Stein et al. | 382/104 |
| 2003/0099400 A1 * | 5/2003 | Ishikawa | 382/104 |
| 2003/0210807 A1 * | 11/2003 | Sato et al. | 382/104 |
| 2005/0196020 A1 * | 9/2005 | Comaniciu et al. | 382/104 |
| 2006/0091286 A1 * | 5/2006 | Finizio et al. | 250/206.1 |

FOREIGN PATENT DOCUMENTS

JP    09-259282    10/1997

OTHER PUBLICATIONS

Coombs et al., Real-Time Obstacle Avoidance Using Central Flow Divergence, and Peripheral Flow, Feb. 1998, IEEE Transactions on Robotics and Automation, vol. 14, No. 1, pp. 49-59.*

(Continued)

*Primary Examiner*—Jefferey F Harold
*Assistant Examiner*—Daniel Zeilberger
(74) *Attorney, Agent, or Firm*—McDermott Will & Emery LLP

(57) ABSTRACT

An aspect of the present invention provides a moving obstacle detecting device installed in or on a moving body for detecting moving obstacles in the vicinity of the moving body, the moving obstacle detecting device that includes an image capturing unit configured and arranged to capture an image of the surroundings of the moving body, an optical flow calculating unit configured to find an optical flow corresponding to characteristic points in the image captured with the camera, a focus of expansion calculating unit configured to calculate focus or foci of expansion of the motion vectors in the optical flow found by the optical flow calculating unit, a histogram creating unit configured to create a histogram of the distribution of the focus or foci of expansion calculated by the focus of expansion calculating unit, a peak test unit configured to detect at least one moving obstacle to test peaks in the histogram, the test determining whether or not the peaks correspond to the same object if two or more peaks exist in the histogram created by the histogram creating unit.

20 Claims, 6 Drawing Sheets

OTHER PUBLICATIONS

Detection of Obstacle from Monocular Vision Based on Histogram Matching Method, Aug. 5-10, 1996, Proceedings of the 1996 IEEE IECON 22nd International Conference on Industrial Electronics, Control, and Instrumentation, vol. 2, pp. 1047-1051.*

* cited by examiner

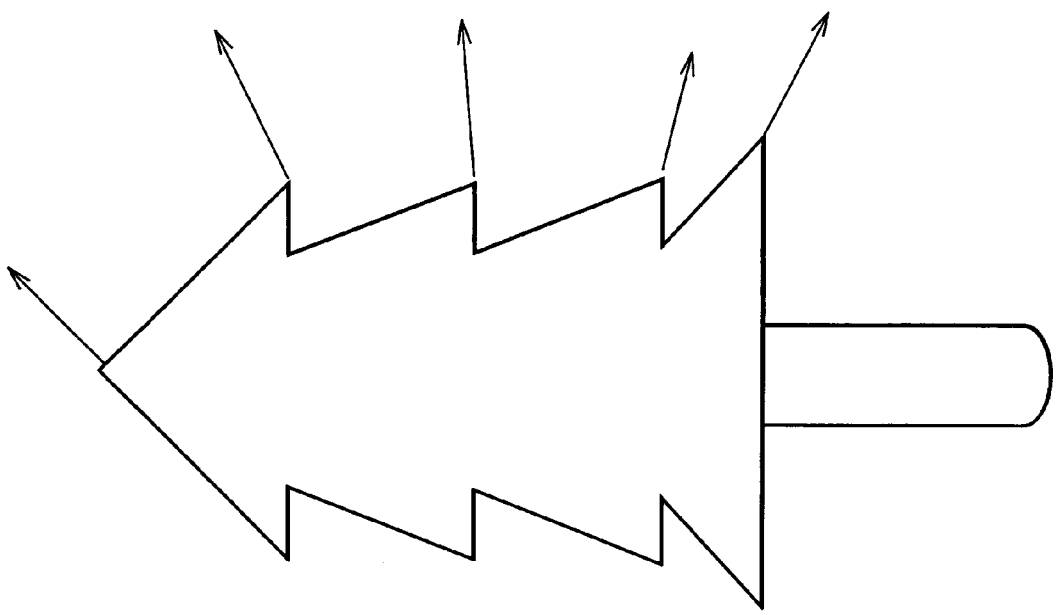
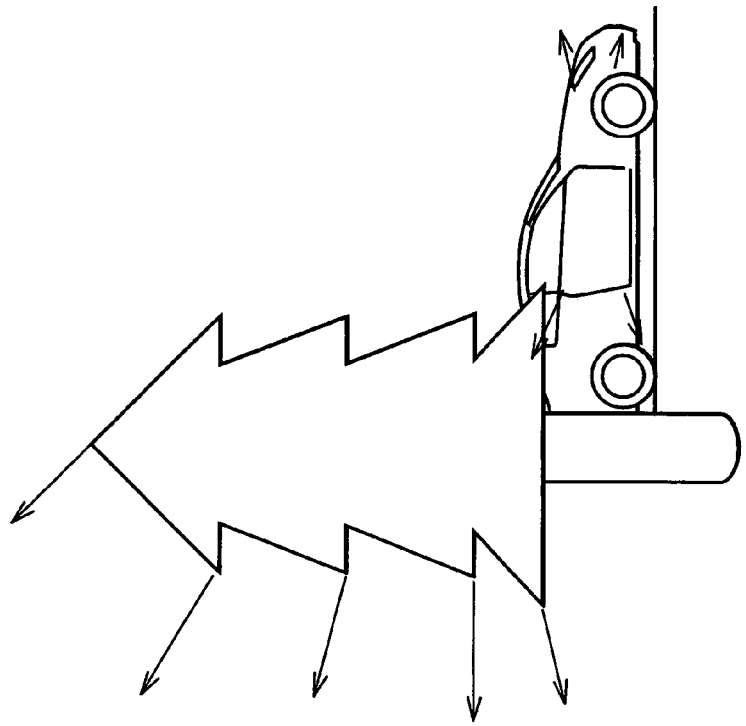
FIG. 3

MOVING OBSTACLE DETECTING DEVICE

BACKGROUND OF THE INVENTION

The present invention relates to a moving obstacle detecting device installed on a vehicle or other moving body and serving to detect the existence of a moving obstacle in the vicinity of the moving body.

An example of an existing device installed on a vehicle and serving to detect the existence of another vehicle or a pedestrian that will cross in front of the vehicle is disclosed in Japanese Laid-open Patent Publication No. Hei9-259282 (Patent Document 1). In Patent Document 1, an image captured by photographing the surroundings of the vehicle is divided into two regions, one in which a moving obstacle exists and one in which the obstacle does not exist, and the position and direction of movement of the obstacle is calculated based on output obtained from the two regions.

The method of identifying the moving obstacle during this processing is to divide the image into small regions and calculate an overall estimated residual value for each region. By using an overall estimated residual value, when the foci of expansion (FOE) of motion vectors of the optical flow are calculated, the regions in which a moving object exists can be determined by finding the regions where there are more than one foci of expansion, i.e., the regions where extension lines coinciding with the motion vectors of the optical flow do not converge into a single focus of expansion.

SUMMARY OF THE INVENTION

Since the device disclosed in the aforementioned Patent Document 1 does not execute the previously described image processing with respect to the entire image, i.e., since it executes the processing separately for each small region, it is not capable of detecting moving objects that are too large to be contained in a single small region.

The present invention was conceived in order to resolve this problem in the prior art and its object is to provide a moving obstacle detecting device that can detect the existence of a moving obstacle with a higher degree of precision.

An aspect of the present invention provides a moving obstacle detecting device installed in or on a moving body for detecting moving obstacles in the vicinity of the moving body, the moving obstacle detecting device that includes an image capturing unit configured and arranged to capture an image of the surroundings of the moving body, an optical flow calculating unit configured to find an optical flow corresponding to characteristic points in the image captured with the camera, a focus of expansion calculating unit configured to calculate focus or foci of expansion of the motion vectors in the optical flow found by the optical flow calculating unit, a histogram creating unit configured to create a histogram of the distribution of the focus or foci of expansion calculated by the focus of expansion calculating unit, a peak test unit configured to detect at least one moving obstacle to test peaks in the histogram, the test determining whether or not the peaks correspond to the same object if two or more peaks exist in the histogram created by the histogram creating unit.

Another aspect of the present invention provides a moving obstacle detecting method for detecting moving obstacles existing in the vicinity of a moving body that includes steps below: (1) capturing an image of the surroundings of the moving body, (2) finding an optical flow corresponding to characteristic points in the captured image, (3) calculating focus or foci of expansion of the motion vectors in the optical flow, (4) creating a histogram of the distribution of the focus or foci of expansion calculated, and (5) detecting at least one moving obstacle to test peaks in the created histogram to determine whether or not the peaks correspond to the same object determine if two or more peaks exist in the histogram of the foci of expansion created.

BRIEF DESCRIPTION OF THE DRAWINGS

FIG. 3 shows an optical flow extracted from an image captured by the camera.

DETAILED DESCRIPTION OF EMBODIMENTS

Figure 1:
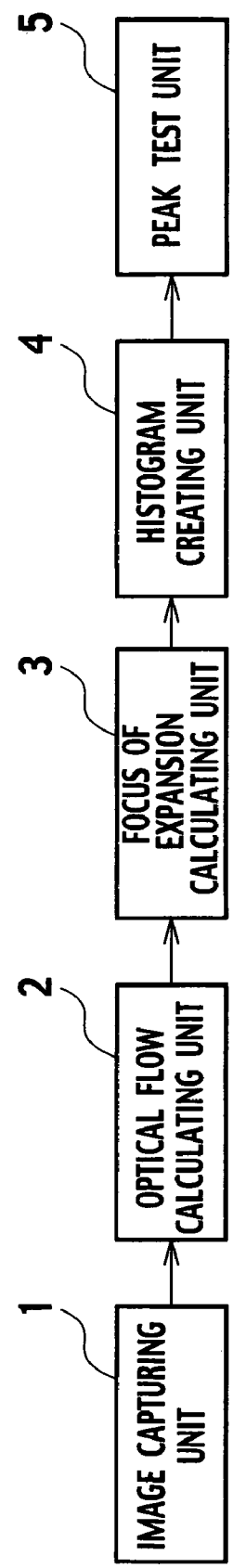
FIG. 1 is a block diagram showing the constituent features of a moving obstacle detecting device of an embodiment in accordance with the present invention.

An embodiment of the present invention will now be described with reference to the drawings. Parts that are identical or similar are indicated in the drawings with the same reference numerals and duplicate descriptions thereof are omitted for the sake of brevity.

FIG. 1 is a block diagram showing the constituent features of a moving obstacle detecting device of an embodiment in accordance with the present invention. This embodiment exemplifies a case in which the moving body on which the device is installed is a vehicle and the moving obstacle is another vehicle or a pedestrian in the vicinity of the vehicle. The embodiment merely presents an example and the present invention is not limited to a vehicle as the moving body and a vehicle or pedestrian as the moving obstacle. As shown in FIG. 1, the moving obstacle detecting device includes the following: a camera (image capturing unit) 1 configured and arranged to capture an image of the surroundings of a vehicle; an optical flow calculating unit 2 configured to calculate an optical flow made up of motion vectors using the image captured with the camera 1; a focus of expansion calculating unit 3 configured to calculate the focus or foci of expansion of the optical flow, i.e., calculate the point(s) where lines coinciding with the motion vectors that make up the optical flow intersect; a histogram creating unit 4 configured to establish a prescribed axis and create a histogram of the foci of expansion along the established axis; a peak test unit 5 configured to find the positions of peaks in the created histogram and test the peaks to determine if the peaks correspond to the same object or to different objects.

Figure 2:
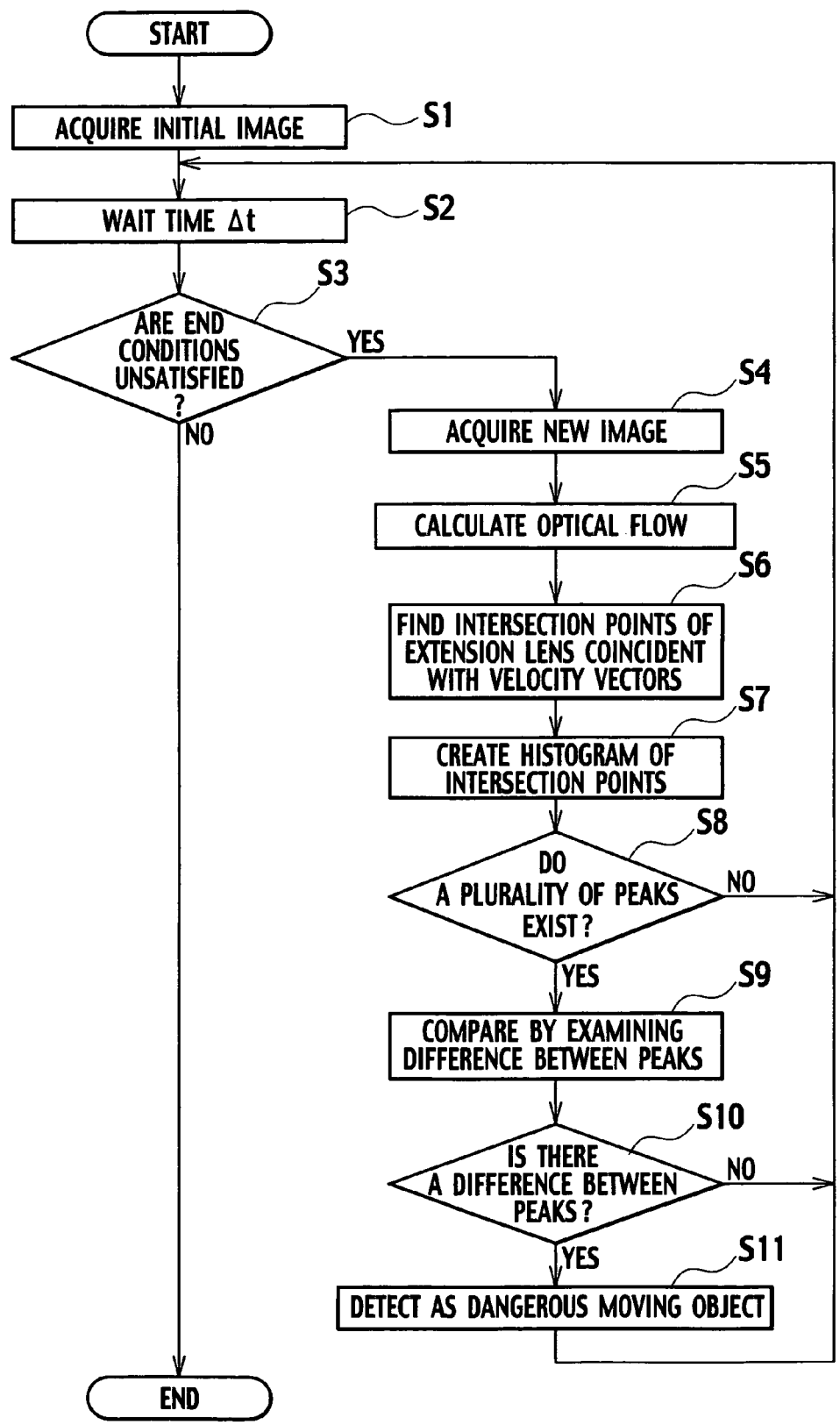
FIG. 2 is a flowchart showing the processing operations executed by a moving obstacle detecting device of an embodiment in accordance with the present invention.

FIG. 2 is a flowchart showing the processing operations executed by a moving obstacle detecting device of an embodiment in accordance with the present invention. The operation of a moving obstacle detecting device in accordance with this embodiment will now be explained with reference to the flowchart of FIG. 2. When the processing sequence starts, the device acquires an initial image by employing the camera 1 mounted on the vehicle to capture an image of a region in front of the vehicle (step S1). The device then waits a preset time interval (image capturing time interval) Δt (step S2) before checking if the conditions for ending the processing sequence are satisfied (step S3). If the conditions for ending the processing sequence are not satisfied, the device captures a new image (step S4). Next, the optical flow calculating unit 2 compares the initial image and the new image and thereby calculates an optical flow based on these images, which were captured by the camera 1 mounted on the vehicle while the vehicle was moving. In this way, an optical flow like that shown in FIG. 3 (for example) can be obtained. In this specification, an optical flow refers to a velocity field comprising the relative motion vectors of points on an object existing in the captured image, said relative velocity resulting from the motion of the vehicle, motion of the object, or both. By analyzing the motion vectors of the optical flow, the existence, position, size, and other aspects of obstacles encountered while the vehicle is moving can be recognized.

The time interval according to which the optical flow calculating unit 2 calculates the optical flow can be varied based on one or more of the following pieces of information: the angle to which the steering wheel of the vehicle is rotated, the yaw rate detected by a yaw rate sensor, the difference between the rotational speeds of the left and right wheels, the status of the turn signal (directional), and information acquired from a car navigation system comprising a road map and a GPS. For example, when the vehicle is turning at an intersection (i.e., when the rotation angle of the steering wheel is large), the optical flow of the image of the area in front of the vehicle changes greatly; the change in the optical flow can be tracked by setting the timer interval according to which the optical flow is calculated to a smaller value (shorter time interval).

Figure 4:
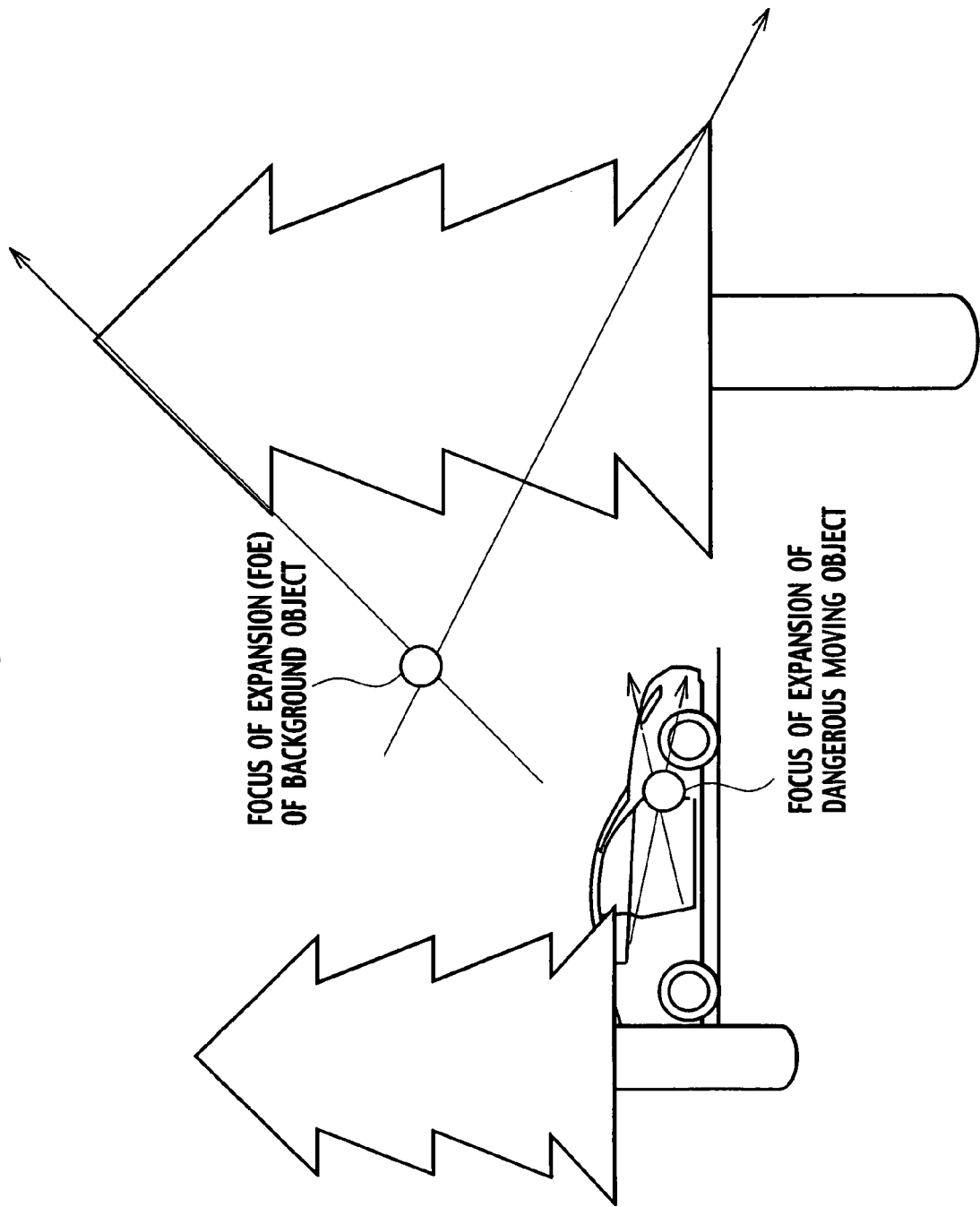
FIG. 4 shows foci of expansion of the optical flow.

Based on the calculated optical flow, the focus of expansion calculating unit 3 calculates foci of expansion by calculating the intersection point(s) where extension lines coinciding with the motion vectors that make up the optical flow intersect (step S6). As a result, the foci of expansion of the optical flow are found as shown in FIG. 4 (for example). If no moving object other than the vehicle itself exists, then the coincident extension lines of all motion vectors making up the optical flow will intersect at a single point. However, in actual practice, since each of the motion vectors includes noise components, a distribution of groups of foci of expansion will be obtained. Also, similarly to the calculation of the optical flow, the time interval according to which the focus of expansion calculating unit 3 calculates foci of expansion can be varied based on one or more of the following pieces of information: the angle to which the steering wheel of the vehicle is rotated, the yaw rate detected by a yaw rate sensor, the difference between the rotational speeds of the left and right wheels, the status of the turn signal (directional), and information acquired from a car navigation system comprising a road map and a GPS.

Next, based on the distribution of the foci of expansion calculated, the histogram creating unit 4 creates a histogram showing the distribution of the foci of expansion along an X-axis (a horizontal axis in the plane of the image of the area in front of the vehicle) (step S7). As a result, a histogram like that shown in FIG. 5 (for example) can be obtained. The width (i.e., the X-axis dimension) of the bars making up the histogram is adjusted based on the number of motion vectors making up the optical flow. The reason the histogram is created along the X-axis is that the objects that need to be detected are often moving along the direction of the X-axis. If necessary, it is also possible to change the axis along which the histogram is created.

After the histogram is created, the device detects the peaks of the histogram (step S8). If only one peak exists in the histogram (i.e., if the result of step S8 is "No"), the device determines that a dangerous object that might cross in front of the vehicle from the side does not exist and returns to step S2.

Figure 5:
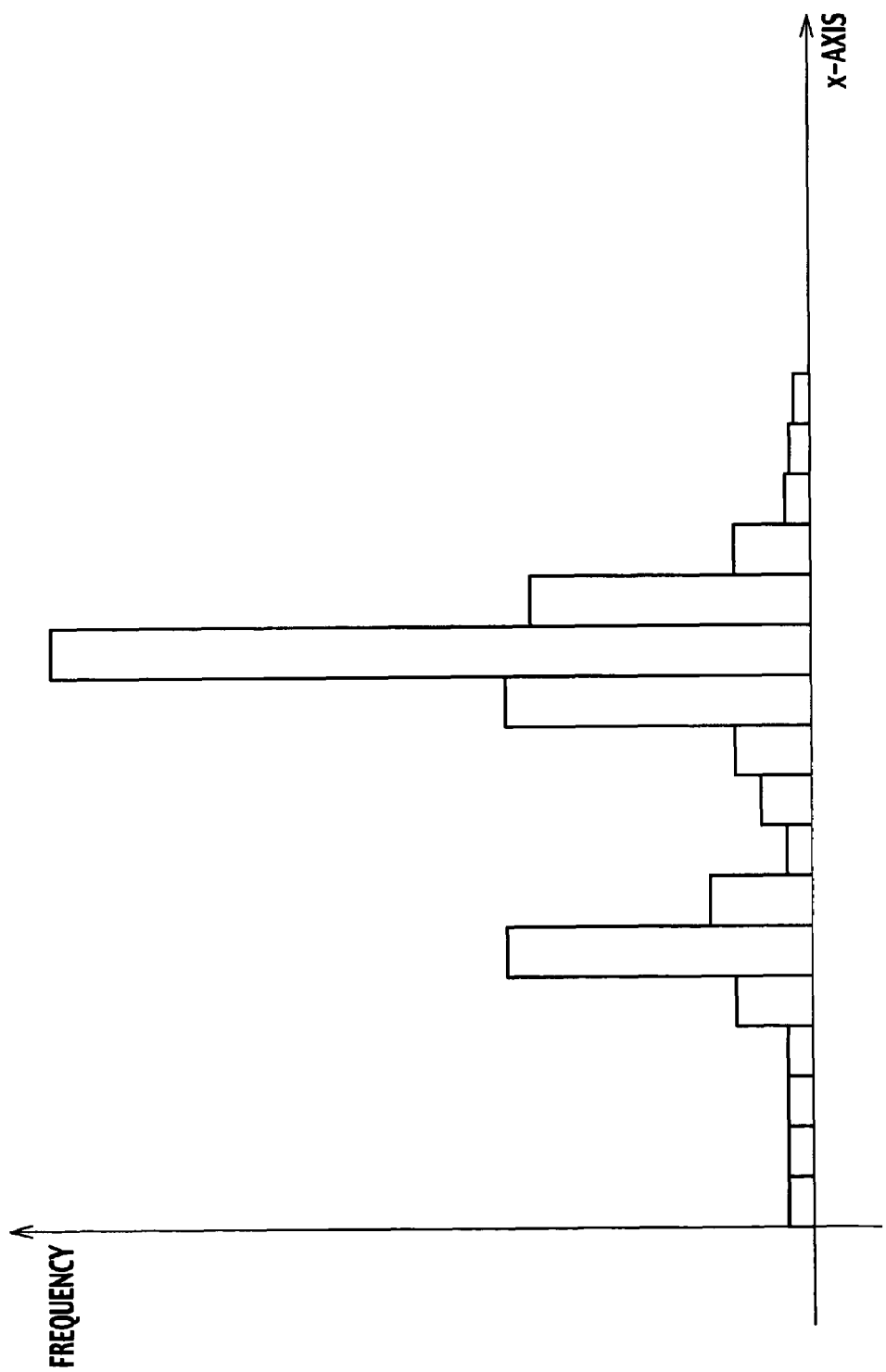
FIG. 5 shows a histogram of foci of expansion of the optical flow.
Figure 6:
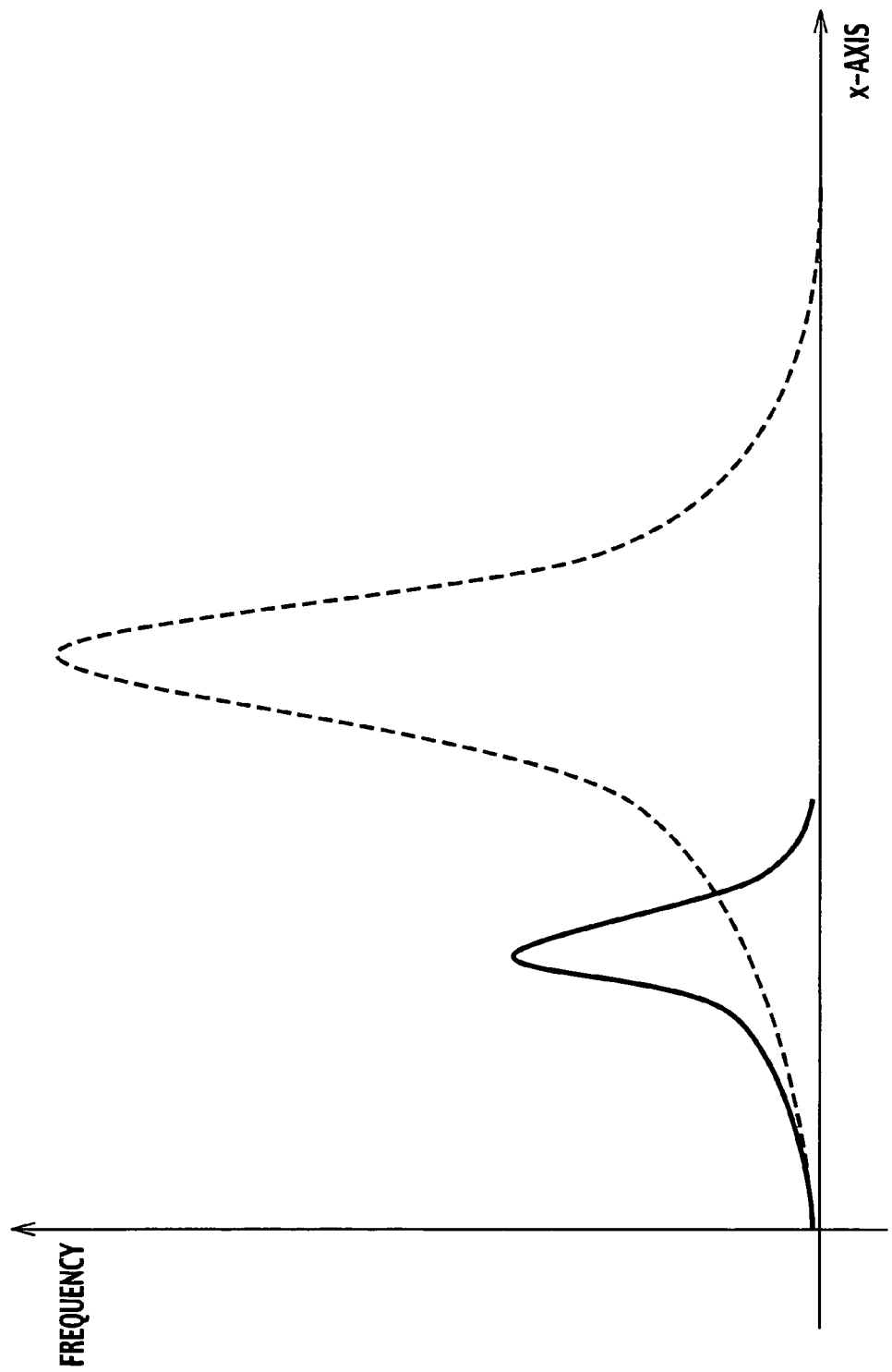
FIG. 6 shows a characteristic curves made up of the two groups in the histogram.

Meanwhile, if in step S8 it finds that two or more peaks exist in the histogram (as shown in FIG. 5), the device compares the highest peak to the other peak(s) to determine if the peaks are parts of the same distribution or different distributions. The method of examining the peaks will now be described. First, the device separates the motion vectors of the optical flow into a group of motion vectors whose foci of expansion are included in the peak having the highest value and a group of motion vectors whose foci of expansion are included in the other peak (the peak to which the highest peak is being compared). As a result, characteristic curves made up of the two groups can be obtained (as shown in FIG. 6) and two distributions of foci of expansion are created by recalculating the foci of expansion of the motion vectors in each of the two groups. The device then tests the two distributions to determine if it is possible that the two groups occurred within the same population. The well-known t-test is used to examine the difference between the two groups. The t-value is a statistical quantity and when it is less than a risk level $\alpha$, the device determines that the two groups are a single distribution (i.e., the result "No" is obtained in step S10). Meanwhile, if the t-value is larger than the risk level $\alpha$, the two groups are determined to be of different distributions (i.e., the result "Yes" is obtained in step S10).

The value 0.05, for example, can be used for the risk level $\alpha$ (i.e., $\alpha=0.05$). It is also feasible to change the risk level $\alpha$ depending on such parameters as the road conditions and the number of pedestrians. Concrete examples of how such parameters might be employed include decreasing the risk level $\alpha$ in situations where the vehicle is traveling on a city street or it is anticipated that an obstacle may suddenly cross in front of the vehicle and increasing the risk level $\alpha$ in situations where it is unlikely that an obstacle will suddenly cross in front of the vehicle, such as when traveling on a freeway. It is also acceptable to change the risk level $\alpha$ based on one or more of the following pieces of information: the width of the road on which the vehicle is traveling, the existence or absence of a sidewalk, the number of lanes, the time of day during which the vehicle is traveling, the weather at the time when the vehicle is traveling, and information acquired from a car navigation system comprising a road map and a GPS.

The t-test will now be described in detail. First, the statistical quantity t is calculated using the equation (1) shown below.

$$t = \frac{(\overline{X} - \overline{Y})}{\sqrt{\left(\frac{1}{m} + \frac{1}{n}\right)S^2}} \tag{1}$$

In the equation (1), "$\overline{X}$" (hereinafter X(-)) and "$\overline{Y}$" (hereinafter Y(-)) are the X- coordinates of the peaks of the histogram, "S" is a normalized value of the dispersion, "m" is the number of samples in the group corresponding to X(-) and "n" is the number of samples in the group corresponding to Y(-). Since the problem at hand is to determine if there is a significant difference between the two distributions, it is appropriate to use a two-sided test. Thus, the null hypothesis (i.e., the hypothesis that the two distributions are equal) is rejected when $|t| > t\ \alpha/2\ (m+n-2)$ and, otherwise, the null hypothesis is not rejected. In other words, the two peaks are determined to be of different distributions when the condition |t|>t α/2 (m+n−2) exists.

If the result of the test indicates that the two distributions are different, the device determines that a dangerous object (an object moving in such a manner that it will cross in front of the vehicle) exists (step S11) and urges the passenger(s) of the vehicle to be careful by issuing an alarm or the like. The processing is then repeated. In this way, the existence of dangerous objects can be detected based on images of a region in front of the vehicle photographed by the camera 1.

In a moving obstacle detecting device in accordance with this embodiment, an optical flow is calculated based on images captured with a camera 1 and a histogram is created based on the distribution of the foci of expansion of the motion vectors. The positions of the peaks contained in the histogram are then found. If there is more than one peak, the t-test is used to determine if the peaks correspond to distributions of the same group or distributions of different groups. Thus, the existence of a dangerous object poised to cross in front of the vehicle from the side while the vehicle is moving can be detected with a high degree of precision without being affected by noise. As a result, the ability to alert the driver to dangerous objects while the vehicle is traveling can be improved.

Since the axis used in creating the histogram is a horizontal axis (X-axis) of the image of the area in front of the vehicle, the existence of obstacles moving along the transverse direction of the vehicle can be detected with a higher degree of precision. Meanwhile, the axis used for creating the histogram can be changed as appropriate depending on the direction in which the camera 1 is aimed. For example, if the camera 1 is used to photograph a region in rear of the vehicle and optical flow analysis is used to detect the existence of other vehicles attempting to pass the vehicle in which the device is installed, the other vehicles will move in a diagonal direction with respect to the vehicle and it will be possible to detect other vehicles attempting to pass with a high degree of precision by setting the axis along which the histogram is created to a diagonal direction instead of a transverse direction.

The time interval according to which the optical flow is calculated can be varied based on one or more of the following pieces of information: the angle to which the steering wheel of the vehicle is rotated, the yaw rate detected by a yaw rate sensor, the difference between the rotational speeds of the left and right wheels, the status of the turn signal (directional), and information acquired from a car navigation system comprising a road map and a GPS. By adjusting the time interval appropriately when, for example, the optical flow changes greatly due to such conditions as the vehicle turning at an intersection, the changes in the optical flow can be tracked with the image processing and the frequency with which moving obstacles are incorrectly detected can be markedly reduced.

Similarly, the time interval according to which foci of expansion are calculated can be varied based on one or more of the following pieces of information: the angle to which the steering wheel of the vehicle is rotated, the yaw rate detected by a yaw rate sensor, the difference between the rotational speeds of the left and right wheels, the status of the turn signal (directional), and information acquired from a car navigation system comprising a road map and a GPS. By adjusting the time interval appropriately when, for example, the optical flow changes greatly due to such conditions as the vehicle turning at an intersection, the changes in the optical flow can be tracked with the image processing and the frequency with which moving obstacles are incorrectly detected can be markedly reduced.

It is also acceptable to change the risk level used in the t-test based on one or more of the following pieces of information: the width of the road on which the vehicle is traveling, the existence or absence of a sidewalk, the number of lanes, the time of day during which the vehicle is traveling, the weather at the time when the vehicle is traveling, and information acquired from a car navigation system comprising a road map and a GPS. By changing the risk level in accordance with the traveling conditions of the vehicle, moving obstacles can be detected with a higher degree of precision.

Although a vehicle (automobile) is used as an example of the moving body in the previously described embodiment, the invention is not limited to such an arrangement and the invention can be applied to situations in which the moving body is an electric train or other object that moves.

Although an example in which there are two peaks in the histogram is presented in the previously described embodiment, the invention can also be applied to a situation in which there are three or more peaks by assuming that the group having the largest peak value is an optical flow resulting from the motion of the vehicle in which the device is installed and executing the processing sequence described above a plurality of times, i.e., once for each pair of groups comprising the motion vector resulting from the motion of the vehicle and one of the other motion vectors (i.e., once between the maximum peak and each of the other peaks). In this way, the existence of two or more moving obstacles can be detected.

Although the embodiment presents an example in which the peak test unit 5 uses the t-test as the method of test the peaks, the present invention is not limited to using the t-test. Other examining methods can also be used.

Thus, in a moving obstacle detecting device in accordance with this embodiment, an optical flow is calculated based on images captured with an image capturing unit and a histogram is created based on the distribution of the foci of expansion of the motion vectors. The positions of the peaks contained in the histogram are then found. If there is more than one peak, a test method is used to determine if the peaks correspond to distributions of the same group or distributions of different groups of motion vectors. When the distributions are determined to be of different groups of motion vectors, the groups of motion vectors is determined to result from a moving obstacle. As a result, the existence of obstacles that are moving relative to a moving body can be detected with a high degree of precision.

The entire contents of Japanese patent application P2004-205989 filed Jul. 13, 2004 are hereby incorporated by reference.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A moving obstacle detecting device installed in or on a moving body for detecting moving obstacles in the vicinity of the moving body, the moving obstacle detecting device comprising:

an image capturing unit configured and arranged to capture an image of the surroundings of the moving body;

an optical flow calculating unit configured to find an optical flow corresponding to characteristic points in the image captured with the camera;

a focus of expansion calculating unit configured to calculate focus or foci of expansion of the motion vectors in the optical flow found by the optical flow calculating unit;

a histogram creating unit configured to create a histogram of the distribution of the focus or foci of expansion calculated by the focus of expansion calculating unit;

a peak test unit configured to detect at least one moving obstacle to test peaks in the histogram, said test determining whether or not the peaks correspond to the same object if two or more peaks exist in the histogram created by the histogram creating unit.

2. The moving obstacle detecting device as claimed in claim 1, wherein the histogram creating unit is configured to create the histogram of the distribution of the foci of expansion based on a predetermined axis.

3. The moving obstacle detecting device as claimed in claim 2, wherein the direction of the axis along which the histogram is created is changed in accordance with the location on the moving body where the image capturing unit is installed.

4. The moving obstacle detecting device as claimed in claim 1, wherein the histogram creating unit is configured to create the histogram of the distribution of the foci of expansion along an axis oriented in the transverse direction of the moving body based on the foci of expansion calculated by the focus of expansion calculating unit.

5. The moving obstacle detecting device as claimed in claim 1, wherein the moving body is a vehicle.

6. The moving obstacle detecting device as claimed in claim 5, wherein the optical flow calculating unit is configured to vary the time interval according to which it calculates the motion vectors based on one or more of the following pieces of information: the angle to which the steering wheel of the vehicle is rotated, the yaw rate detected by a yaw rate sensor, the difference between the rotational speeds of the left and right wheels, the status of the turn signal (directional), and information acquired from a car navigation system comprising a road map and a GPS.

7. The moving obstacle detecting device as claimed in claim 5, wherein the focus of expansion calculating unit is configured to vary the time interval according to which it calculates the foci of expansion based on one or more of the following pieces of information: the angle to which the steering wheel of the vehicle is rotated, the yaw rate detected by a yaw rate sensor, the difference between the rotational speeds of the left and right wheels, the status of the turn signal (directional), and information acquired from a car navigation system comprising a road map and a GPS.

8. The moving obstacle detecting device as claimed in claim 5, wherein the peak examining unit is configured to:

use a prescribed risk level to determine if the peaks correspond to the same object when two or more peaks are found to exist in the histogram of the foci of expansion created by the histogram creating unit; and vary the risk level based on one or more of the following pieces of information: the width of the road on which the vehicle is traveling, the existence or absence of a sidewalk the number of lanes, the time of day during which the vehicle is traveling, the weather at the time when the vehicle is traveling, and information acquired from a car navigation system comprising a road map and a GPS.

9. The moving obstacle detecting device as claimed in claim 8, wherein the peak examining unit is configured to detect a moving obstacle(s) by determining if the highest peak among the plurality of peaks that exist is of the same distribution as each of the other peak(s).

10. The moving obstacle detecting device as claimed in claim 9, wherein the peak examining unit is configured to separate the motion vectors of the optical flow into a group of motion vectors whose foci of expansion are included in the highest peak and a group of motion vectors whose foci of expansion are included in other peak(s), generate distributions of the foci of expansion in each of the groups of motion vectors, and calculate the probability that the distributions of the foci of expansion in the two groups of motion vectors occurred within the same population.

11. The moving obstacle detecting device as claimed in claim 10, wherein the peak examining unit is configured such that when it calculates the probability that the distributions of the foci of expansion in two groups of motion vectors occurred within the same population, it uses the t-test to test the difference between the two groups and determines that the distributions are different when the t-value is larger than a prescribed value.

12. The moving obstacle detecting device as claimed in claim 11, wherein said prescribed value is set to a smaller value in situations where the number of moving obstacles is large and to a larger value in situations where the number of moving obstacles is small.

13. The moving obstacle detecting device as claimed in claim 12, wherein the prescribed value is varied based on one or more of the following pieces of information: the width of the road on which the vehicle is traveling, the existence or absence of a sidewalk the number of lanes, the time of day during which the vehicle is traveling, the weather at the time when the vehicle is traveling, and information acquired from a car navigation system comprising a road map and a GPS.

14. A moving obstacle detecting method for detecting moving obstacles existing in the vicinity of a moving body, comprising:

(1) capturing an image of the surroundings of the moving body;

(2) finding an optical flow corresponding to characteristic points in the captured image;

(3) calculating focus or foci of expansion of the motion vectors in the optical flow;

(4) creating a histogram of the distribution of the focus or foci of expansion calculated; and (5) detecting at least one moving obstacle to test peaks in the created histogram to determine whether or not the peaks correspond to the same object determine if two or more peaks exist in the histogram of the foci of expansion created.

15. The moving obstacle detecting method as claimed in claim 14, wherein the step (4) creates the histogram of the distribution of the foci of expansion based on a predetermined axis.

16. The moving obstacle detecting method as claimed in claim 14, wherein the step (4) creates the histogram of the distribution of the foci of expansion along an axis oriented in the transverse direction of the moving body based on the foci of expansion calculated.

17. The moving obstacle detecting method as claimed in claim 14, wherein the step (2) varies the time interval according to which it calculates the motion vectors based on one or more of the following pieces of information: the angle to which the steering wheel of the moving body is rotated, the yaw rate detected by a yaw rate sensor, the difference between the rotational speeds of the left and right wheels, the status of the turn signal (directional), and information acquired from a car navigation system comprising a road map and a GPS.

18. The moving obstacle detecting method as claimed in claim 14, wherein the step (3) varies the time interval according to which it calculates the foci of expansion based on one or more of the following pieces of information: the angle to which the steering wheel of the moving body is rotated, the yaw rate detected by a yaw rate sensor, the difference between the rotational speeds of the left and right wheels, the status of the turn signal (directional), and information acquired from a car navigation system comprising a road map and a GPS.

19. The moving obstacle detecting method as claimed in claim 14, wherein the step (5) uses a prescribed risk level to determine if the peaks correspond to the same object when two or more peaks are found to exist in the histogram of the foci of expansion created; and varies the risk level based on one or more of the following pieces of information: the width of the road on which the vehicle is traveling, the existence or absence of a sidewalk the number of lanes, the time of day during which the vehicle is traveling, the weather at the time when the vehicle is traveling, and information acquired from a car navigation system comprising a road map and a GPS.

20. The moving obstacle detecting method as claimed in claim 19, wherein step (5) detects a moving obstacle(s) by determining if the highest peak among the plurality of peaks that exist is of the same distribution as each of the other peak(s).

* * * * *